(12) United States Patent
Gherekhloo et al.

(10) Patent No.: US 11,909,726 B2
(45) Date of Patent: Feb. 20, 2024

(54) METHOD FOR CONTROLLING A VEHICLE (71) Applicant: Robert Bosch GmbH, Stuttgart (DE)

(72) Inventors: Soheil Gherekhloo, Lauffen am Neckar (DE); Jan-Felix Van Dam, Huenxe (DE); Ralf Prenzel, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 93 days.

(21) Appl. No.: 17/595,775

(22) PCT Filed: Apr. 28, 2020

(86) PCT No.: PCT/EP2020/061689
§ 371 (c)(1),
(2) Date: Nov. 24, 2021

(87) PCT Pub. No.: WO2020/239344
PCT Pub. Date: Dec. 3, 2020

(65) Prior Publication Data
US 2022/0224676 A1 Jul. 14, 2022

(30) Foreign Application Priority Data
May 27, 2019 (DE) ...................... 10 2019 207 753.6

(51) Int. Cl.
*H04L 29/06* (2006.01)
*H04L 9/40* (2022.01)
(Continued)

(52) U.S. Cl.
CPC ........ *H04L 63/0435* (2013.01); *H04L 9/0822* (2013.01); *H04L 63/065* (2013.01); *H04W 12/02* (2013.01)

(58) Field of Classification Search
CPC . H04L 63/0435; H04L 9/0822; H04L 63/065; H04L 63/0428; H04L 2209/84;
(Continued)

(56) References Cited

U.S. PATENT DOCUMENTS 7,215,775 B2 * 5/2007 Noguchi .................. H04L 9/32
455/411
2012/0328098 A1 12/2012 Chandrashekar et al.
(Continued)

FOREIGN PATENT DOCUMENTS

| DE | 102017213298 A1 | 2/2019 |
|---|---|---|
| DE | 102018214354 A1 | 2/2020 |
| WO | 2017153240 A1 | 9/2017 |

OTHER PUBLICATIONS

International Search Report for PCT/EP2020/061689, dated Aug. 5, 2020.

(Continued)

*Primary Examiner* — Yogesh Paliwal
(74) *Attorney, Agent, or Firm* — NORTON ROSE FULBRIGHT US LLP; Gerard A. Messina (57) ABSTRACT A method for applying control to a vehicle. The method includes: receiving, by way of a second control unit of a second vehicle to which control is to be applied, a signal encompassing a message encrypted using a valid symmetrical key of a first control unit of a first vehicle; ascertaining, by way of the second control unit, a decryptability of the encrypted message using a valid symmetrical key of the second control unit or a symmetrical reserve key of the second control unit ascertained by way of the second control unit; ecrypting the encrypted message, depending on the ascertained decryptability, by way of the second control unit using the valid symmetrical key of the second control unit or the symmetrical reserve key of the second control unit; and applying control, based on the decrypted message, to the second vehicle to which control is to be applied.

11 Claims, 2 Drawing Sheets (51) Int. Cl.
*H04L 9/08* (2006.01)
*H04W 12/02* (2009.01)
(58) Field of Classification Search
CPC ... H04W 12/02; H04W 4/46; B60R 2325/108
See application file for complete search history.

(56) References Cited

U.S. PATENT DOCUMENTS

2013/0182844 A1 7/2013 Nagai et al.
2018/0367514 A1* 12/2018 Kido .................. H04L 67/12

OTHER PUBLICATIONS 802.11P-2010—IEEE Standard for Information Technology—Telecommunications and Information Exchange Between Systems—Local and Metropolitan Area Networks—Specific Requirements, Part 11: Wireless LAN Medium Access Control (MAC) and Physical Layer (Phy) Specifications; Amendment 6: Wireless Access in Vehicular Environments, 2010, pp. 1-50.
Raya et al., "Securing Vehicular Ad Hoc Networks," Journal of Computer Security, NL, vol. 15, No. 1, 2007, pp. 39-68. https://www.semanticscholar.org/paper/Securing-vehicular-ad-hoc-networks-Raya-Hubaux/978bfa27fd21b1c93a3c758b6b50b8992b47b5d3.

* cited by examiner

METHOD FOR CONTROLLING A VEHICLE

FIELD

The present invention relates to a method for applying control to a vehicle, and relates to a computer program and to a machine-readable storage medium on which the computer program is stored. The present invention also relates to a control unit and a grouping of control units.

BACKGROUND INFORMATION

Methods are available for controlling a "platoon" or vehicle grouping of commercial vehicles driving one behind another and connected by vehicle-to-vehicle communication, in which the spacings between the individual commercial vehicles of the vehicle grouping, or platoon participants, are regulated to approximately ten to fifteen meters by way of an automatic longitudinal guidance system, so that the fuel consumption and vehicle emissions of the platoon can be reduced by decreasing the air resistance. Because the spacing between the vehicles of the platoon is considerably less than the safety margin currently prescribed by law, V2X communication messages must be exchanged between the vehicles to ensure safe driving.

The V2X specification defines, in accordance with cooperative intelligent transport systems (C-ITS), so-called "cooperative awareness messages" (CAMs) which contain, for instance, the position of a vehicle in the vehicle grouping as well as further information. These messages can be read by all vehicles that have implemented the corresponding protocol. Further messages between the vehicles may be necessary in order to enable a vehicle grouping, for example platoon control messages (PCMs) and platoon management messages (PMMs).

While driving in a platoon, each platoon participant can transmit to all other platoon participants, cyclically and at short time intervals, a PCM encompassing its current status. This PCM is encrypted, so that only the platoon participants can decode this message. The PCMs serve to maintain and control the platoon, and thus to regulate the speed of each individual platoon participant. The PCM contains a time stamp that is generated by the sender of the message.

The PMMs are transmitted in event-based fashion. Depending on the application, they are partly encrypted; for instance, a vehicle can be added to the platoon by way of defined "join request" and "join response" PMMs. The join request PMM is not encrypted, but the transmitting vehicle adds a signature and its authentication certificate to this message, so that the receiving vehicle can verify the message using the certificate.

German Patent Application No. DE 10 2018 214 354 A1 describes a method that enables secure distribution and use of a symmetrical group key utilizing a public key or a symmetrical pair key in the context of vehicle-to-vehicle communication. The symmetrical group key is distributed to each vehicle of a vehicle platoon for purposes of secure communication within the group.

SUMMARY

The present invention relates to a method for applying control to a vehicle.

In accordance with an example embodiment of the present invention, the method encompasses a step of receiving, by way of a second control unit of a second vehicle to which control is to be applied, a signal encompassing a message encrypted using a valid symmetrical key of a first control unit of a first vehicle. In other words, a signal is received by way of the second control unit of the second vehicle to which control is to be applied, the signal encompassing a message that has been encrypted using the valid symmetrical key of the first control unit of the first vehicle.

The example method further encompasses a step of ascertaining, by way of the second control unit, a decryptability of the encrypted message. On the one hand, the decryptability of the encrypted message using a valid symmetrical key of the second control unit is ascertained. On the other hand, the decryptability of the encrypted message using a symmetrical reserve key of the second control unit ascertained by way of the second control unit is ascertained.

The example method furthermore encompasses a step of decrypting the encrypted message, depending on the ascertained decryptability, by way of the second control unit. In a first alternative, the encrypted message is decrypted using the valid symmetrical key of the second control unit. In a second alternative, the encrypted message is decrypted using the symmetrical reserve key of the second control unit.

The example method also encompasses a step of applying control based on the decrypted message, in particular based on a content of the decrypted message, to the second vehicle to which control is to be applied. Control can be applied to the second vehicle by way of the second control unit or a vehicle-external control unit. The application of control to the second vehicle can be an application of control to a unit of the second vehicle. The application of control to the second vehicle can encompass an output of a control signal to the unit of the vehicle.

A control unit for applying control to a vehicle is also a subject of the present invention.

In accordance with an example embodiment of the present invention, the control unit is configured to receive a signal encompassing a message encrypted using a valid symmetrical key of a first control unit of a first vehicle. In other words, the control unit is configured to receive a signal, the signal encompassing a message that has been encrypted using the valid symmetrical key of the first control unit of the first vehicle.

The example control unit is further configured to ascertain a decryptability of the encrypted message. On the one hand, the control unit is configured to ascertain the decryptability of the encrypted message using a valid symmetrical key of the control unit. On the other hand, the control unit is configured to ascertain the decryptability of the encrypted message using a symmetrical reserve key of the control unit ascertained by way of the control unit.

The example control unit is furthermore configured to decrypt the encrypted message depending on the ascertained decryptability. On the one hand, in a first alternative, the control unit is configured to decrypt the encrypted message using the valid symmetrical key of the control unit. On the other hand, in a second alternative, the control unit is configured to decrypt the encrypted message using the symmetrical reserve key of the control unit.

The example control unit is also configured to apply control, based on (in particular a content of) the decrypted message, to a second vehicle to which control is to be applied.

A "signal" can be understood in the context of the present invention as an electromagnetic, electrical, or optical signal that is wire-based or preferably is transferred wirelessly. The first and the second signal are preferably wirelessly transferred signals. The signal can be a radio signal, in particular a mobile radio signal, a DRSC signal, or a WLAN signal.

The signal encompasses an, in particular machine-readable, message, for instance in the form of a defined modulation of the signal. The message can encompass one or several message fields. The message fields encompass one or several information items that are transferred by way of the signal.

The encrypted message is a cryptographically encrypted message. The encrypted message can be a partly or completely encrypted message. It is possible for the message to encompass in part an unencrypted header data set and an encrypted content data set. The encrypted message has been encrypted using, or by way of, a cryptographic encrypting method. The encrypted message can also be decrypted using, or by way of, a cryptographic decrypting method.

A valid key is necessary for encrypting and/or decrypting the message. A "key" can be understood in the context of the present invention as a cryptographic key by the use of which the message can be encrypted in the context of the cryptographic encrypting method and/or decrypted in the context of the cryptographic decrypting method. The key is to be understood as a data set, preferably an, in particular randomly generated, character string or character sequence.

In the context of the present invention, the key is a symmetrical key. In other words, the key is a key of a symmetrical encrypting or decrypting method. The symmetrical key for encrypting the message is therefore identical to the symmetrical key for decrypting the encrypted message.

A "valid key" of a control unit can be understood in the context of the present invention as a cryptographic key that is associated with the control unit and is provided or specified for encrypting a message that is to be transmitted and/or for decrypting a received message. A message to be transmitted by way of a control unit is encrypted using the valid key of the control unit. A message received by way of the control unit is checked with regard to decryptability using the valid key of the control unit.

The decryptability of an encrypted message using a key represents an information item as to whether the encrypted message is or is not decryptable using, or by way of, the key. The decryptability of an encrypted message M1 using a key K_c (current key) can encompass, for example, a statement of the form "M1 decryptable by way of K_c" or "M1 not decryptable by way of K_c."

The decryptability of an encrypted message using a valid key or a reserve key represents an information item as to whether the encrypted message is or is not decryptable using the valid key or the reserve key. The decryptability of an encrypted message M1 using a valid key K_c or a reserve key K_r can encompass, for example, a statement of the form "M1 decryptable by way of K_r" or "M1 not decryptable by way of K_c, M1 decryptable by way of K_r."

The reserve key is a reserve key of the valid key. The reserve key can replace the valid key if a received message is not decryptable using the valid key and/or if the valid key is not to be used to encrypt a message that is to be transmitted. It is also possible for the reserve key to be a set of at least two, preferably more than two, reserve keys. It is possible in this context for the set of reserve keys to be ascertained before the decryptability of the encrypted message is ascertained. It is also possible for one or several reserve keys of the set of reserve keys to be ascertained before decryptability is ascertained, and for one or several reserve keys of the set of reserve keys to be ascertained after decryptability is ascertained.

The key and the reserve key can be respectively ascertained by each of the control units using a key generation method or a key derivation method. The key generation method is an algorithm, available to one skilled in the art, for generating a cryptographic key. A predefined or already present, for example previously valid, key is used as an input variable for the key generation method. The key generation method proceeds deterministically. In other words, using the same key generation method and the same key as input variable, different control units generate the same key.

In the context of the present invention, the sequence in which different keys are generated in succession by a control unit is therefore the same for all control units. The valid keys of the control units which exist at a fixed point in time can, however, be different from one another. It is also possible that a valid key of a first control unit has already been used as a valid key at an earlier point in time, or will be used as a valid key only at a later point in time, by a second control unit.

The first vehicle, and the second vehicle to which control is to be applied, are preferably vehicles of a vehicle grouping. Particularly preferably, the vehicle grouping encompasses one or several further second vehicles in addition to the first and the second vehicle.

A "vehicle grouping" or "platoon" can be understood in the context of the present invention as a grouping or aggregation of at least two vehicles on one common travel path. The vehicle grouping or vehicle aggregation can be a vehicle column or vehicle convoy. It is also possible for the vehicle grouping to involve vehicles driving one behind another in formation. In other words, the vehicles of the vehicle grouping are embodied to drive one behind another in a defined vehicle sequence, in particular with no mechanical connection between the vehicles, i.e., using a so-called "electronic drawbar."

The vehicles of the vehicle grouping can drive one behind another with a very small physical spacing from one another, preferably less than or equal to 50 m, particularly preferably less than or equal to 15 m, in order to reduce a fuel consumption, or a conversion of electrical energy into energy of motion, as a result of the decreased air resistance or the decreased aerodynamic resistance of the vehicles in the vehicle grouping. It is also possible for one, several, or all of the vehicles of the vehicle grouping to be embodied for autonomous operation, in particular for autonomous driving. The vehicles can be controlled in semiautomated, highly automated, or fully automated fashion.

Preferably, a first vehicle preceding the other vehicles of the vehicle grouping, or a lead vehicle of the vehicle grouping, is a semiautomated or fully automated vehicle. Preferably, the vehicles of the vehicle grouping following the one first preceding vehicle of the vehicle grouping are fully automated vehicles. For this purpose, at least the vehicles of the vehicle grouping which follow the preceding vehicle or the lead vehicle have a longitudinal-guidance driver assistance system that is embodied to automatically control or regulate a spacing in a travel direction between a following vehicle and a vehicle directly preceding the following vehicle. Alternatively, it is possible for the first vehicle to be a vehicle following the second or a further vehicle of the vehicle grouping.

In accordance with an example embodiment of the present invention, the first and second vehicles, in particular the vehicles of the vehicle grouping, each have a vehicle-side control unit or one disposed on the respective vehicle. The control unit preferably encompasses a computation unit or a processor, a communication module or a communication unit, an antenna, and a memory.

The control unit, or the communication unit of the control unit, of a vehicle is embodied to establish a communication connection with at least one control unit, or communication unit of the control unit, of at least one further vehicle or of an infrastructure device. The communication unit can be a radio device, for example a mobile radio device, or part of a control unit having a mobile radio unit. The communication connection can be a radio connection, for example a communication connection in accordance with the IEEE 802.11p standard, a near-field communication connection, or a mobile radio connection, in particular a 5G mobile radio connection. The infrastructure device can be a computation unit or server unit disposed outside the vehicles or remotely. For instance, the infrastructure device can be a network of several physically distributed computation units disposed outside the vehicles or remotely, or a cloud computing system or a computer cloud. The infrastructure device can also be a server unit of an operator of the vehicles or of an operator of at least portions of the method according to the present invention. By way of the communication unit, data or information can be transferred, in particular wirelessly electronically, between the vehicles and/or between a vehicle and the infrastructure device. The communication unit is preferably embodied and configured to transfer data with a short latency time and/or a high bandwidth.

The vehicles of the vehicle grouping can be transport vehicles or cargo vehicles, for example commercial vehicles, and/or vehicles transporting persons, for example passenger cars. It is also possible for the vehicles to be rail-borne vehicles. The vehicles of the vehicle grouping can be vehicles having an internal combustion engine and/or a fuel cell, and/or hybrid and/or electric vehicles. The vehicle can be a vehicle combination. In other words, the vehicle can encompass a towing vehicle and one or several trailers.

In a preferred embodiment of the present invention, the first and the second vehicle are part of a communication network, in particular of a vehicle grouping, which encompasses at least a third or a further second vehicle. Each vehicle has a control unit according to the present invention. In other words, a transfer of the valid symmetrical key or symmetrical reserve key between the vehicles is not necessary.

The method according to an example embodiment of the present invention and the control unit according to an example embodiment of the present invention improve privacy protection in a communication network between at least two codedly communicating vehicles, with no need to transfer additional data between the vehicles for that purpose. In order to protect the vehicles from trackability on the basis of intercepted encrypted messages, the valid symmetrical key used for encrypting can preferably be repeatedly replaced with the respective reserve key. The reserve key can be ascertained independently by way of each of the control units, so that an exchange of the reserve key, and in particular of a new valid key, between the vehicles is not necessary. The communication connection between the vehicles can thereby be disburdened, and at the same time identification of the vehicles on the basis of intercepted messages can be prevented. In addition, the method can ensure stable communication using messages decryptable for all the control units, even in cases in which valid symmetrical keys are replaced simultaneously by different control units.

It is advantageous if the message encompasses a key identifier of the symmetrical key used for encrypting the message, and if the decryptability of the encrypted message is ascertained based on the key identifier. It is possible for the key identifier, in order to ascertain the decryptability of the message, to compare the symmetrical key used for encrypting the message with a key identifier of a symmetrical key that is present or specified for decrypting the message. In other words, based on a comparison of the key identifiers of the symmetrical key being used, and of the symmetrical key provided for decrypting, it is possible to ascertain whether the symmetrical key that is provided is suitable for decrypting the message. It is also possible for the key identifier of the symmetrical key used for encrypting the message to be compared with key identifiers of several symmetrical keys present or provided for decrypting the message, in order to ascertain or identify the key suitable for decrypting the message. With this configuration it is possible to ascertain particularly quickly whether the encrypted message is decryptable using a key.

It is also advantageous if the method has a step of ascertaining, by way of the second control unit, the symmetrical reserve key of the second control unit using a key generation method and the valid symmetrical key of the second control unit. In other words, the symmetrical reserve key of the second control unit is ascertained by way of the second control unit, an, in particular algorithmic, key generation method, with the valid key of the second control unit as input variable, being carried out for that purpose. Thanks to this configuration, transfer of the symmetrical reserve key to the second control unit is not necessary, thereby disburdening the communication network and speeding up the exchange of relevant data or messages.

It is advantageous in this context if the method encompasses a step of ascertaining, by way of the first control unit, a symmetrical reserve key of the first control unit using the same key generation method and the valid symmetrical key of the first control unit, in order to replace the valid symmetrical key of the first control unit with the ascertained symmetrical reserve key. In other words, the symmetrical reserve key of the first control unit is ascertained by way of the first control unit, the, in particular algorithmic, key generation method, with the valid key of the first control unit as input variable, being carried out for that purpose. The symmetrical reserve key can be ascertained if the valid symmetrical key is no longer valid. Preferably, the symmetrical reserve key is ascertained while the valid symmetrical key is still valid, or before it loses its validity. This configuration ensures that the control units ascertain the same sequence of symmetrical reserve keys.

It is particularly advantageous if the method encompasses a step of replacing the valid symmetrical key of the first and/or second control unit with the symmetrical reserve key ascertained by way of the respective control unit. "Replacing" a valid key with a reserve key can be understood to mean discarding a previously valid key and using the previous reserve key as a valid key for encrypting and decrypting messages. In other words, thanks to the replacing step the previously valid key is not further, or is no longer, used for encrypting and decrypting messages. Preferably, the valid symmetrical key is replaced repeatedly, for example regularly or periodically. Replacing the valid symmetrical key can make it difficult to decrypt intercepted messages, and can thus enhance the privacy protection of the communicating vehicles.

It is advantageous in this context if the replacing of the valid symmetrical key by the ascertained symmetrical reserve key depends on the ascertained decryptability of the encrypted message using the valid key of the respective control unit. Preferably, the valid symmetrical key is replaced by the ascertained symmetrical reserve key if a message received by the respective control unit is not decryptable using the valid symmetrical key. This configuration ensures that upon replacement of the valid symmetrical key of the first control unit in order to decrypt the message, the encrypted message can be decrypted by the second control unit receiving the message, and control can be applied, based on the message, to the vehicle to which control is to be applied.

It is also advantageous if the replacing of the valid symmetrical key by the ascertained symmetrical reserve key depends, alternatively or additionally, on a vehicle information item or a driving information item of the respective vehicle. The vehicle information item can be a modified vehicle identifier such as a modified pseudonym of the vehicle. The driving information item can be an information item regarding a travel path length traveled on a travel path of the vehicle, or a defined driving time duration in particular since a most recent replacement of the valid symmetrical key. It is also possible for the vehicle identifier to be automatically modified or changed after a defined travel path length, for example of less than or equal to 30 km, has been traveled on a travel path of the vehicle grouping, or after a defined time period, for example of less than or equal to 1 minute. This configuration allows the privacy of a communication between the vehicles to be protected particularly effectively.

It is additionally advantageous if the method encompasses a step of transferring a, preferably encrypted, information item regarding the key generation method between the vehicles in order to make it possible to ascertain identical symmetrical keys by way of the various control units. The transferred information item can contain an algorithm of the key generation method, for example a key generation function. The transferred information item can also encompass a unique indicator, for example a defined description or an identification character string, of the key generation method. A message having the transferred information item is preferably encrypted before transfer, using an asymmetrical encrypting method. It is possible for the information item to be transferred, together with an encrypted accession request of the second vehicle, into a communication network and/or a vehicle grouping of the first vehicle. This configuration makes possible particularly well-protected communication between the vehicles, since it does not require exchange of, in particular symmetrical, keys between the vehicles.

It is furthermore advantageous if the method encompasses a step of emitting, by way of the respective control unit, a signal encompassing a message encrypted using the valid symmetrical key of the first and/or second control unit, in order to apply control, based on the message, to the message-receiving first and/or second vehicle. In other words, the application of control to the vehicles is based on encrypted messages of signals transferred between the vehicles. This configuration allows control to be applied to the vehicles from outside anonymously and in particularly manipulation-resistant fashion.

Lastly, it is advantageous if, in the step of applying control, in particular by way of the first and/or second control unit, to the first and/or second vehicle, control is applied to one of the following units of the first and/or second vehicle: propulsion unit, braking unit, steering unit, communication unit, display unit.

An application of control to the propulsion unit and/or the braking unit by way of the control signal can encompass increasing, holding constant, or decreasing a propulsion power level and/or braking power level and/or a driving speed. It is possible for the decrypted message to encompass an information item regarding a braking action of the first vehicle which has been initiated or is to be initiated. Control can be applied to the propulsion unit and/or the braking unit in such a way that the physical spacing between the vehicles is not substantially decreased.

Application of control to the display unit can encompass displaying, by way of the display unit, a required dissolution of the vehicle grouping and/or an enlargement or diminution of the spacing between the vehicles. An application of control to the communication unit can initiate output of a signal having an encrypted message.

Thanks to this configuration, the second vehicle can be operated in particular depending on the decrypted message, but nevertheless in manipulation-resistant fashion.

Advantageously, the method is carried out several times in succession, preferably continuously or constantly while a vehicle group is driving or operating. The first vehicle and/or the second vehicle in the context of a first execution of the method can be different from the first vehicle and/or the second vehicle in the context of a second execution of the method.

BRIEF DESCRIPTION OF THE DRAWINGS

The present invention will be explained below in further detail, by way of example, with reference to the figures.

DETAILED DESCRIPTION OF EXAMPLE EMBODIMENTS

Figure 1:
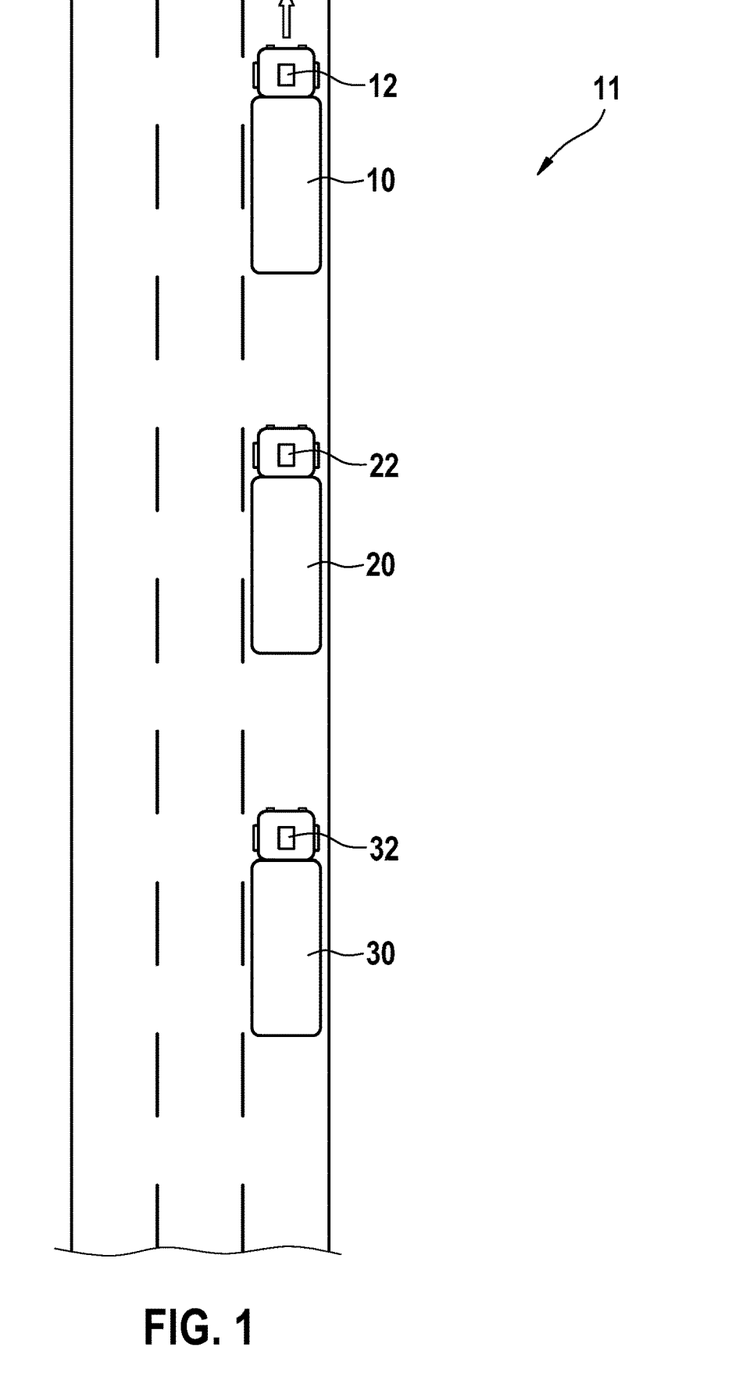
FIG. 1 shows a vehicle grouping having three vehicles.

FIG. 1 shows a vehicle grouping 11 having a first, a second, and a third or further second vehicle 10, 20, 30, respectively embodied as commercial vehicles 10, 20, 30. First vehicle 10 has a first control unit 12. Second vehicle 20 has a second control unit 22. Third or further second vehicle 30 has a further second or third control unit 32. Control units 12, 22, 32 each encompass at least a processor, a communication module, an antenna, and a memory.

Control units 12, 22, 32, or the communication modules of control units 12, 22, 32, are configured to enable vehicle-to-vehicle communication among vehicles 10, 20, 30. In particular, platoon control messages (PCMs), or signals having a PCM, are transferred between the vehicles.

Control units 12, 22, 32 are embodied for communication and corresponding processing of the data necessary for control in vehicle grouping 11 or platoon 11. For this, the antenna of the respective control unit 12, 22, 32 is embodied as a transmit/receive antenna, for example, for GSM/UMTS/LTE/5G communication. Software which enables platooning for commercial vehicles 10, 20, 30, and communicates with other vehicles and with vehicles 10, 20, 30 of platoon 11 using previously publicly defined messages, is installed in each of control units 12, 22, 32, in particular in the respective memory.

Control units 12, 22, 32 are configured in particular to encrypt messages that are to be transmitted and correspondingly to decide received messages, using a cryptographic key and a symmetrical encrypting method. In other words, control units 12, 22, 32 are configured to enable symmetrical encrypted communication among vehicles 10, 20, 30. The cryptographic key is a symmetrical group key. In other words, each of control units 12, 22, 32 is configured to ascertain, using a key generation method and a previously valid symmetrical key, a new valid symmetrical key constituting a group key. Control units 12, 22, 32 are furthermore configured to analogously ascertain a reserve key using the key generation method and the valid key.

Control units 12, 22, 32 are configured to receive a signal encompassing a message encrypted using a valid symmetrical key of one of control units 12, 22, 32. Control units 12, 22, 32 are further configured to ascertain a decryptability of the encrypted message using a valid symmetrical key of the respective control unit 12, 22, 32 or a symmetrical reserve key ascertained by way of the respective control unit 12, 22, 32.

Control units 12, 22, 32 are furthermore configured to decrypt the received encrypted message, depending on the ascertained decryptability, using the valid symmetrical key of the respective control unit 12, 22, 32 or the symmetrical key of the respective control unit 12, 22, 32. In other words, control units 12, 22, 32 are configured to decrypt the encrypted message using the valid symmetrical key or the group key, if the message is decryptable using the valid symmetrical key. Control units 12, 22, 32 are also configured to decrypt the encrypted message using the respective reserve key, if the message is not decryptable using the valid symmetrical key but is decryptable using the reserve key of the respective control unit 12, 22, 32.

Lastly, control units 12, 22, 32 are configured to apply control, based on a content of the decrypted message, to the respective vehicle 10, 20, 30. Control units 12, 22, 32 are configured to control a propulsion unit, a steering unit, and a braking unit of the respective vehicle 10, 20, 30. Control units 12, 22, 32 are configured in particular to control the driving speed (e.g. cruise control, engine controller, brake controller, steering regulation).

Figure 2:
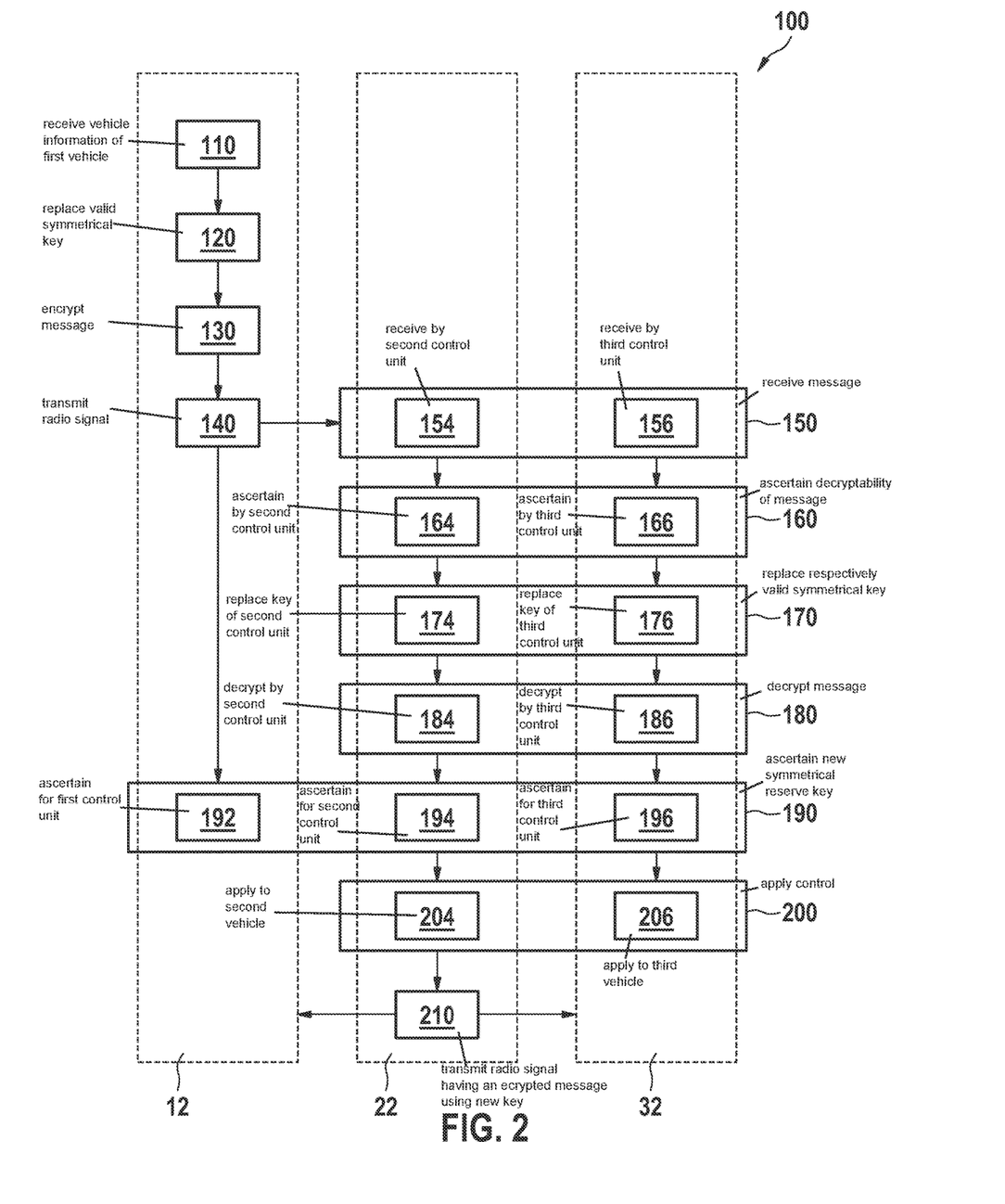
FIG. 2 is a flow chart of a method for controlling a vehicle of the vehicle grouping, in accordance with an example embodiment of the present invention.

FIG. 2 schematically depicts a method for controlling a vehicle 20, 30 of a vehicle grouping 11 in accordance with FIG. 1.

In step 110, a vehicle information item of first vehicle 10 is received by way of first control unit 12. The vehicle information item encompasses an information item with regard to a modified vehicle identifier of first vehicle 10. For instance, the modified vehicle identifier is a modified pseudonym of first vehicle 10. In order to improve privacy protection in the context of communication among vehicles 10, 20, 30, it is possible for the vehicle identifier to be automatically modified or changed after a defined travel path length has been traveled on a travel path of the vehicle grouping, or after a defined time period.

In step 120, based on the modified vehicle identifier of first vehicle 10, the valid symmetrical key of first control unit 12 is replaced by the reserve key of first control unit 12. The reserve key has been ascertained beforehand by way of first control unit 12 using the key generation method and the valid symmetrical key of first control unit 12. In other words, the new valid symmetrical key of first control unit 12 corresponds to the previous reserve key of first control unit 12.

In step 130, a message is cryptographically encrypted using the new valid symmetrical key or the previous reserve key of first control unit 12.

In step 140, a radio signal having the message encrypted in step 130 is transmitted from first control unit 12 to second control unit 22 and to third control unit 32.

In step 150, the signal transmitted by first control unit 12, encompassing the message encrypted using the new valid symmetrical key of first control unit 12, is received by way of control units 22, 32 of further vehicles 20, 30 of vehicle grouping 11. In particular, the signal is received in step 154 by the second control unit and in step 156 by the third control unit.

In step 160, a decryptability of the received encrypted message is ascertained by way of control units 22, 32 of further vehicles 20, 30. In particular, the decryptability of the message is ascertained in step 164 by second control unit 22 and in step 166 by third control unit 32. What is ascertained here is whether the encrypted message can be decrypted by way of the valid symmetrical key of the respective further control unit 22, 32 or by way of the symmetrical reserve key of the respective control unit 22, 32. The valid symmetrical keys of further control units 22, 32 are identical. The symmetrical reserve keys of the further control units are also identical.

In order to ascertain decryptability, a key identifier, contained in the message, of the valid symmetrical key of first control unit 12 is compared with a key identifier of the valid symmetrical key of the respective further control unit 22, 32 and with a key identifier of the reserve key of the respective further control unit 22, 32. In this exemplifying embodiment, the key identifier of the valid symmetrical key of first control unit 12 is different from the key identifier of the valid symmetrical key of the respective further control unit 22, 32, and identical to the key identifier of the reserve key of the respective further control unit 22, 32. In other words, the received message can be decrypted by way of the reserve key of the respective further control unit 22, 32.

In step 170, the respectively valid symmetrical key of further control units 22, 32 is therefore replaced by the reserve key of the respective control unit 22, 32. The reserve key has been ascertained beforehand using the key generation method and the valid symmetrical key of the respective control unit 22, 32. In other words, the new valid symmetrical key of further control units 22, 32 corresponds to the previous reserve key of the respective control unit 22, 32. In particular, in step 174 the key of second control unit 22, and in step 176 the key of third control unit 32, is correspondingly replaced.

In step 180, the received encrypted message is cryptographically decrypted depending on the ascertained decryptability. In this exemplifying embodiment, the encrypted message is decrypted using the symmetrical reserve key of further control units 22, 32. In particular, in step 184 the encrypted message is decrypted by way of second control unit 22, and in step 186 the encrypted message is decrypted by way of third control unit 32.

In step 190, a new symmetrical reserve key of control units 12, 22, 32 is ascertained using the key generation method and the valid symmetrical key of the respective control unit 12, 22, 32. In particular, in step 192 the new symmetrical reserve key of first control unit 12 is ascertained, in step 194 the new symmetrical reserve key of second control unit 22 is ascertained, and in step 196 the new symmetrical reserve key of third control unit 32 is ascertained.

In step 200 control is applied, based on the decrypted message, to further vehicles 20, 30 of vehicle grouping 11. In particular, control is applied, based on the decrypted message, to second vehicle 20 in step 204, and to third vehicle 30 in step 206. In this exemplifying embodiment control is applied, based on the content of the decrypted message, to a second braking unit of second vehicle 20 and to a third braking unit of third vehicle 30 in order to increase a physical spacing between vehicles 10, 20, 30.

In step 210, a radio signal having a message encrypted using the new valid symmetrical key or the previous reserve key of second control unit 22 is transmitted from second control unit 22 to first control unit 12 and to third control unit 32.

The method can be continued by way of analogous steps of receiving the signal transmitted by second control unit 22, ascertaining the decryptability of the message encompassed by that signal, decrypting the encrypted message, and applying control to the respective vehicle 10, 30.

If an exemplifying embodiment encompasses an "and/or" relationship between a first feature and a second feature, this is to be read to mean that the exemplifying embodiment according to one embodiment has both the first feature and the second feature, and according to a further embodiment has either only the first feature or only the second feature.

What is claimed is:

1. A method for applying control to a vehicle, comprising the following steps:
   receiving, using a second control unit of a second vehicle to which control is to be applied, a signal encompassing a message encrypted using a valid symmetrical key of a first control unit of a first vehicle;
   ascertaining, using the second control unit, a decryptability of the encrypted message using: (i) a valid symmetrical key of the second control unit or (ii) a symmetrical reserve key of the second control unit ascertained using the second control unit, wherein the ascertaining includes:
      determining whether the encrypted message is decryptable using the valid symmetrical key, and
      in case that the encrypted message is not decryptable using the valid symmetrical key, determining that the encrypted message is decryptable by the symmetrical reserve key;
   decrypting the encrypted message, depending on the ascertained decryptability, using the second control unit, using (i) the valid symmetrical key of the second control unit or (ii) the symmetrical reserve key of the second control unit; and
   applying control, based on the decrypted message, to the second vehicle to which control is to be applied.

2. The method as recited in claim 1, further comprising:
   ascertaining, using the second control unit, the symmetrical reserve key of the second control unit using a key generation method and the valid symmetrical key of the second control unit.

3. The method as recited in claim 2, further comprising:
   ascertaining, using the first control unit, a symmetrical reserve key of the first control unit using the same key generation method and the valid symmetrical key of the first control unit, to replace the valid symmetrical key of the first control unit with the ascertained symmetrical reserve key.

4. The method as recited in claim 2, further comprising:
   transferring an encrypted information item regarding the key generation method between the first and second vehicles to make it possible to ascertain identical symmetrical keys using the first and second control units.

5. The method as recited in claim 1, further comprising:
   replacing the valid symmetrical key of the first and/or the second control unit with the symmetrical reserve key ascertained using the first and/or second control unit.

6. The method as recited in claim 5, wherein the replacing of the valid symmetrical key by the ascertained symmetrical reserve key depends on: (i) the ascertained decryptability of the encrypted message, and/or (ii) a vehicle information item or a driving information item of the first and/or second vehicle.

7. The method as recited in claim 1, further comprising:
   emitting, using the first and/or second control unit, a signal encompassing a message encrypted using the valid symmetrical key of the first and/or second control unit in order to apply control, based on the message, to the second vehicle.

8. The method as recited in claim 1, wherein in the step of applying control, control is applied to one of the following units of the second vehicle: propulsion unit, braking unit, steering unit, communication unit, display unit.

9. A non-transitory machine-readable storage medium on which is stored a computer program for applying control to a vehicle, the computer program, when executed by a computer, causing the computer to perform or control the following steps:
   receiving, using a second control unit of a second vehicle to which control is to be applied, a signal encompassing a message encrypted using a valid symmetrical key of a first control unit of a first vehicle;
   ascertaining, using the second control unit, a decryptability of the encrypted message using: (i) a valid symmetrical key of the second control unit or (ii) a symmetrical reserve key of the second control unit ascertained using the second control unit, wherein the ascertaining includes:
      determining whether the encrypted message is decryptable using the valid symmetrical key, and
      in case that the encrypted message is not decryptable using the valid symmetrical key, determining that the encrypted message is decryptable by the symmetrical reserve key;
   decrypting the encrypted message, depending on the ascertained decryptability, using the second control unit, using (i) the valid symmetrical key of the second control unit or (ii) the symmetrical reserve key of the second control unit; and
   applying control, based on the decrypted message, to the second vehicle to which control is to be applied.

10. A control unit configured to apply control to a vehicle, the control unit configured to which unit is configured to:
    receive a signal encompassing a message encrypted using a valid symmetrical key of a first control unit of a first vehicle;
    ascertain a decryptability of the encrypted message using: (i) a valid symmetrical key of the control unit, or (ii) a symmetrical reserve key of the control unit ascertained using the control unit, wherein in order to ascertain the decryptability of the encrypted message, the control unit is configured to:
       determine whether the encrypted message is decryptable using the valid symmetrical key, and
       in case that the encrypted message is not decryptable using the valid symmetrical key, determine that the encrypted message is decryptable by the symmetrical reserve key;
    decrypt the encrypted message, depending on the ascertained decryptability, using: (i) the valid symmetrical key of the control unit, or (ii) the symmetrical reserve key of the control unit; and
    apply control, based on the decrypted message, to a second vehicle to which control is to be applied.

11. A grouping of control units, comprising:
at least one first control unit disposed in a first vehicle; and
a second control unit disposed in a second vehicle;
wherein each respective control unit of the first and second control units is configured to:
  receive a signal encompassing a message encrypted using a valid symmetrical key of a respective other one of the first and second control unit;
ascertain a decryptability of the encrypted message using: (i) a valid symmetrical key of the respective control unit, or (ii) a symmetrical reserve key of the control unit ascertained using the respective control unit, wherein in order to ascertain the decryptability of the encrypted message, each respective control unit is configured to:
  determine whether the encrypted message is decryptable using the valid symmetrical key, and
  in case that the encrypted message is not decryptable using the valid symmetrical key, determine that the encrypted message is decryptable by the symmetrical reserve key;
  decrypt the encrypted message, depending on the ascertained decryptability, using: (i) the valid symmetrical key of the respective control unit, or (ii) the symmetrical reserve key of the respective control unit; and
  apply control, based on the decrypted message, to a respective one of the first and second vehicles within which the respective control unit is disposed.

* * * * *